United States Patent
Beer et al.

(10) Patent No.: US 7,134,412 B2
(45) Date of Patent: Nov. 14, 2006

(54) METHOD FOR INCREASING THE REPRODUCIBILITY OF THE START-UP DURING START-STOP OPERATION OF AN INTERNAL COMBUSTION ENGINE

(75) Inventors: Johannes Beer, Regensburg (DE); Roland Herfurth, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/400,834

(22) Filed: Apr. 7, 2006

(65) Prior Publication Data

US 2006/0225701 A1    Oct. 12, 2006

(30) Foreign Application Priority Data

Apr. 7, 2005 (DE) .................. 10 2005 016 067

(51) Int. Cl.
*F02D 41/06* (2006.01)

(52) U.S. Cl. .................... 123/179.16; 123/406.51

(58) Field of Classification Search ........... 123/179.17, 123/179.16, 179.5, 406.46, 406.5, 406.51, 123/406.23, 406.24, 406.25, 406.36, 179.18
See application file for complete search history.

(56) References Cited

U.S. PATENT DOCUMENTS

| 5,575,257 | A | * | 11/1996 | Lange et al. | 123/339.11 |
| 5,759,133 | A | * | 6/1998 | Treinies et al. | 477/110 |
| 6,047,681 | A | * | 4/2000 | Scherer et al. | 123/406.46 |
| 6,705,289 | B1 | * | 3/2004 | Keller et al. | 123/406.5 |
| 6,993,427 | B1 | * | 1/2006 | Ueda | 701/111 |
| 2003/0041831 | A1 | * | 3/2003 | Aoki et al. | 123/179.4 |
| 2004/0221837 | A1 | * | 11/2004 | Kassner | 123/565 |
| 2006/0081215 | A1 | * | 4/2006 | Kinoshita | 123/339.11 |

FOREIGN PATENT DOCUMENTS

| DE | 43 04 163 A1 | 8/1994 |
| JP | 2001055943 A | 2/2001 |
| JP | 2004218606 A | 8/2004 |

* cited by examiner

*Primary Examiner*—Carl S. Miller

(57) ABSTRACT

This invention relates to a method for increasing the reproducibility of the start-up in the start-stop operation of an internal combustion engine of a motor vehicle with start optimization. The reproducibility of the start-up is increased by reducing a maximum speed gradient that can be achieved for different stop positions of the internal combustion engine to a set speed gradient.

13 Claims, 3 Drawing Sheets

Start strategy: 4 cylinder DI engine
Timing initial combustion

METHOD FOR INCREASING THE REPRODUCIBILITY OF THE START-UP DURING START-STOP OPERATION OF AN INTERNAL COMBUSTION ENGINE

CROSS REFERENCE TO RELATED APPLICATIONS

This application claims the priority and benefit of German Patent application No. 10 2005 016 067.0 filed Apr. 7, 2005 and is incorporated by reference herein in the entirety.

FIELD OF THE INVENTION

This invention relates to a method for improving the start optimization of the internal combustion engine of a motor vehicle that is used in start-stop operation.

BACKGROUND OF THE INVENTION

In order to reduce the fuel consumption in motor vehicles, the internal combustion engine is paused or stopped when the motor vehicle is at a standstill and then restarted as soon as the motor vehicle is to drive on. This start-stop operation is used with a start optimization which allows the internal combustion engine to be started even before synchronization has occurred with the crankshaft. A prerequisite for the start optimization is that one knows the position of the engine after the internal combustion engine has stopped, so that, when a first tooth flank of the crankshaft sensor is detected, incrementation can be used to determine the current engine position up until synchronization. After synchronization, the start-up procedure is continued in the usual manner.

The different speed developments of an internal combustion engine with direct injection that is running up and which is operated with or without start optimization, are shown in FIG. 1. The curve with the broken line shows the speed development for an operation without start optimization, while the curve with the unbroken line represents the speed development for an operation with start optimization. The speed developments are entered on the same time axis, so that it is possible to make a direct chronological comparison of the two speed developments. One can see that at the point in time t=430 ms, the internal combustion engine with start optimization has already reached idling speed, whereas the internal combustion engine with the conventional start strategy fires for the first time at this point in time. The curve for the operation with start optimization shows marked fluctuations in speed while the engine is running up. These fluctuations occur because of the influence of the compression work that the cylinder has to perform, the influence of the friction and by an intermittent release of moments. A start-stop operation of this type is disclosed in DE 43 04 163 A1, the start optimization of which is shown in FIG. 2. One can see that the different cylinder charges of the initial combustion, for example in a four-cylinder internal combustion engine during the start optimization, i.e. before synchronization, depend on the stop position of the internal combustion engine. In the case of an internal combustion engine with more than four cylinders, it is also possible to have several initial combustions during the start optimization, which combustions influence the start behavior of the internal combustion engine. The dependence of the stop position occurs in particular for direct injection internal combustion engines. As only with direct injection after closing the inlet valve, fuel can still be inserted into the combustion chamber and thus combustion of a cylinder charge dependent on the stop position can be realized. In contrast, in the case of engines with inlet manifold fuel injection systems, the fuel injection is completed at the end of the inlet phase, so that there is always a maximum cylinder charge for the initial combustion for the start optimization of an engine with an inlet manifold fuel injection system.

As shown in FIG. 2, depending on the stop position of an internal combustion engine with four cylinders, it is possible to have one or several combustions during the start optimization. The stop positions and the positions discussed further here, are given respectively as crankshaft angles. Because of their cylinder charges these combustions form the varying speed development up to synchronization. Because of these varying initial conditions of the respective combustion during the start optimization, chemical energy is not reproducibly converted into kinetic energy. This is represented by way of example in FIG. 3, which shows and compares the speed developments and the rotary accelerations of the start up of the internal combustion engine starting from a stop position of 45° after the top dead centre and of 90° after the top dead centre. One can see that the rotary acceleration at approximately 4500 revs/min$^{-1}$*s$^{-1}$ at a stop position of 45° after the top dead centre is almost twice as great as the rotary acceleration of 2600 revs/min$^{-1}$*s$^{-1}$ at a stop position of 90° after the top dead centre. This varying dynamic during the start optimization results in a load moment which acts on the longitudinal axis of the vehicle, this is especially the case with vehicles with the internal combustion engine built in lengthwise because of the conservation of momentum. Subject to the stop position, this load moment varies in size and creates a corresponding tendency to roll in the motor vehicle. The driver of the motor vehicle will experience this tendency to roll as an "unrest" in the motor vehicle or as a disturbance in its "start experience". Therefore, for driver comfort, it is necessary for the start behavior of an internal combustion engine to be reproducible regardless of its stop position in the start-stop operation.

SUMMARY OF THE INVENTION

Therefore, an object of the present invention is to provide a method of increasing the reproducibility of the start-up of an internal combustion engine of a motor vehicle with start optimization.

The above object is achieved by means of the method defined in the claims. Advantageous embodiments and further developments of the method are presented in the following description and in the claims.

The aim of this method is to create a reproducible start behavior of the internal combustion engine or a reproducibility of the start-up within the context of start optimization of an internal combustion engine in start-stop operation, in order to make the start-stop operation as comfortable as possible for the user of the motor vehicle. The method increases the reproducibility of the start-up, by first calculating a possible maximum speed gradient for the initial combustion or combustions in the start optimization phase, based on a stop position of the internal combustion engine. Whether during the start optimization phase only one or several initial combustions must be allowed for, depends on the number of cylinders in the internal combustion engine and the thus respective possible initial combustion in the different cylinders before synchronization. This maximum speed gradient results from making optimum use of charging the cylinder to the maximum with fuel and air possible in this stop position of the internal combustion engine, and from converting this cylinder charge with the help of an optimal ignition angle.

As with this invention it is not the respective maximum possible speed gradient of the initial combustion or combustions during the start optimization that is to be realized, then, in a further step, the maximum speed gradient is reduced to a set speed gradient that is achievable for different stop positions of the internal combustion engine. The set speed gradient is chosen in such a way that it corresponds to the maximum speed gradient of the most frequently occurring stop position of the internal combustion engine being looked at. As the most frequently occurring stop position is influenced by the properties of the internal combustion engine, the set speed gradient for different internal combustion engines can also be different. The speed gradient of a stop position which is before the stop position of the set speed gradient, i.e. at a smaller crankshaft angle, can be reduced to the set speed gradient by means of the method described below. However, a stop position can also occur that is after the most frequently occurring stop position. In this case, the speed gradient of the initial combustion cannot be increased to the set speed gradient. It is for this reason that preferably a set speed gradient is chosen which corresponds to a stop position with a greater crankshaft angle than the most frequent stop position of the internal combustion engine. Thus the set speed gradient can be created despite different stop positions, because the respective maximum speed gradient of the individual stop position is greater than or equal to the set speed gradient. If one now specifically reduces the respective maximum speed gradient to the set speed gradient, then one arrives at the desired reproducibility. This reproducibility during the start optimization guarantees the user of the motor vehicle reproducible behavior from the internal combustion engine and thus a comfortable "start experience". The maximum speed gradient can be reduced to the set speed gradient, in which, with the help of an ignition angle retard and/or with an inlet valve timing retard the efficiency of the first combustion/combustions and/or the cylinder charge respectively is/are specifically adapted to the desired value.

In order to simplify and speed up the method, according to one embodiment use is made of an engine characteristic map for the maximum speed gradient. Said map represents the maximum speed gradient at an optimal ignition angle and an optimal fuel amount subject to the stop position of the internal combustion engine and an engine temperature. This maximum speed gradient to be taken from the engine characteristic map is then set in ratio to a set speed gradient for different stop positions, so it can be used to adjust the efficiency of the initial combustion or combustions of the start optimization. This ratio forms the ignition angle efficiency, which shows how severely the maximum possible speed gradient must be reduced for the current stop position in order to achieve a reproducible and for the driver pleasant "start experience" of the motor vehicle.

If the internal combustion engine works with adjusting the timing of opening and closing the inlet valves, it is equally possible in this way to adapt the achievable maximum speed gradient for a specific stop position of the internal combustion engine. In this embodiment of the present method, the inlet valve timing retard is likewise taken into account in the calculation of the ignition angle efficiency.

In order to finally specifically reduce the efficiency of the initial combustion/combustions during the start optimization, an ignition angle offset is calculated from the ignition angle efficiency, by which ignition angle offset the optimal ignition angle of the initial combustion or combustions is moved in the direction late. In this way, the efficiency of the combustion is reduced during the start optimization, but at the same time reproducible piston forces required for a pleasant "start experience" are provided.

DETAILED DESCRIPTION OF THE INVENTION

Figure 1:
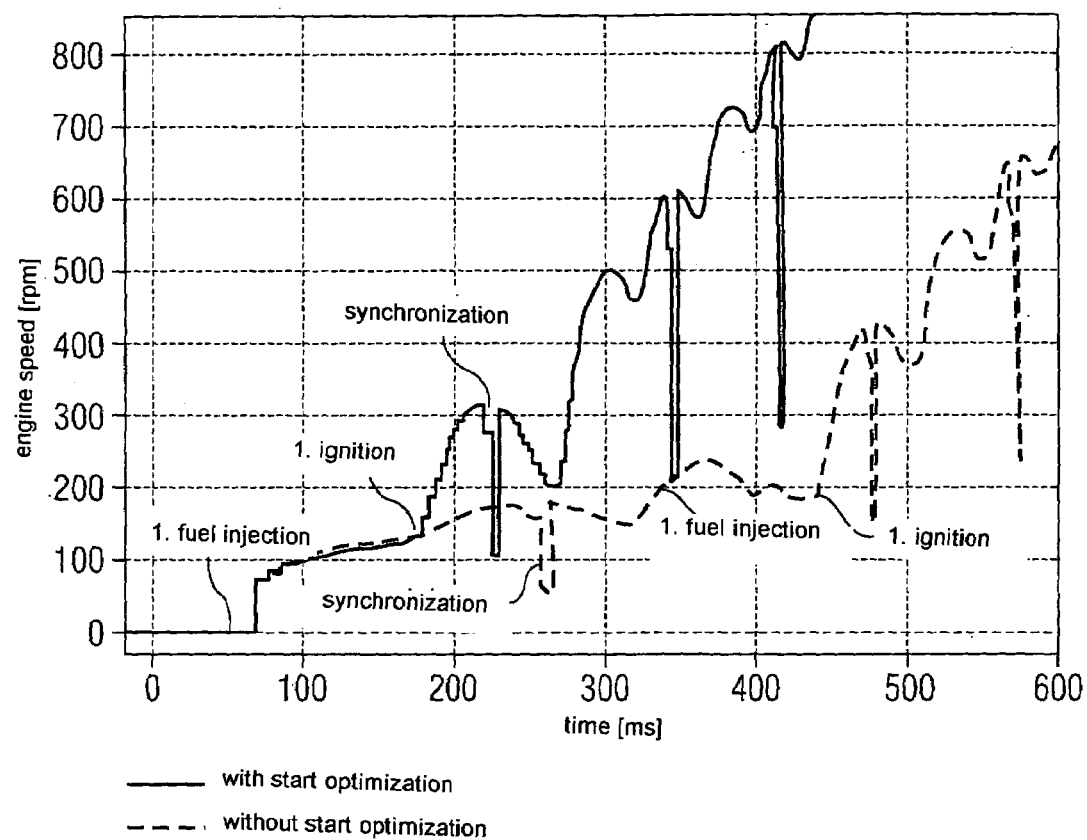
FIG. 1 a comparative representation of the engine speed for an internal combustion engine with start optimization and an internal combustion engine without start optimization, FIG. 2 the representation of a start optimization with a stop position defined with reference to ignition TDC, as is known from prior art, FIG. 3 the comparison of the initial start optimized ignition at a stop position of 45° after the top dead centre and at the stop position of 90° after the top dead centre.
Figure 2:
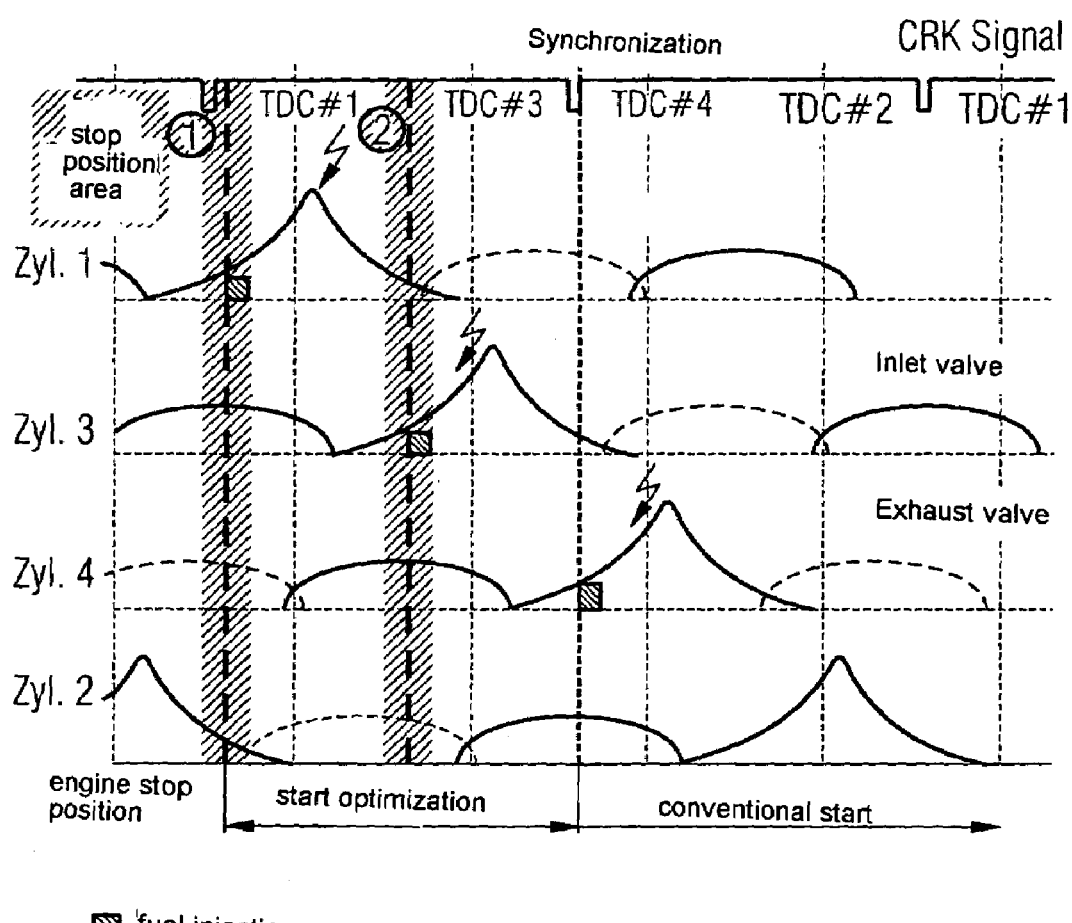
Figure 3:
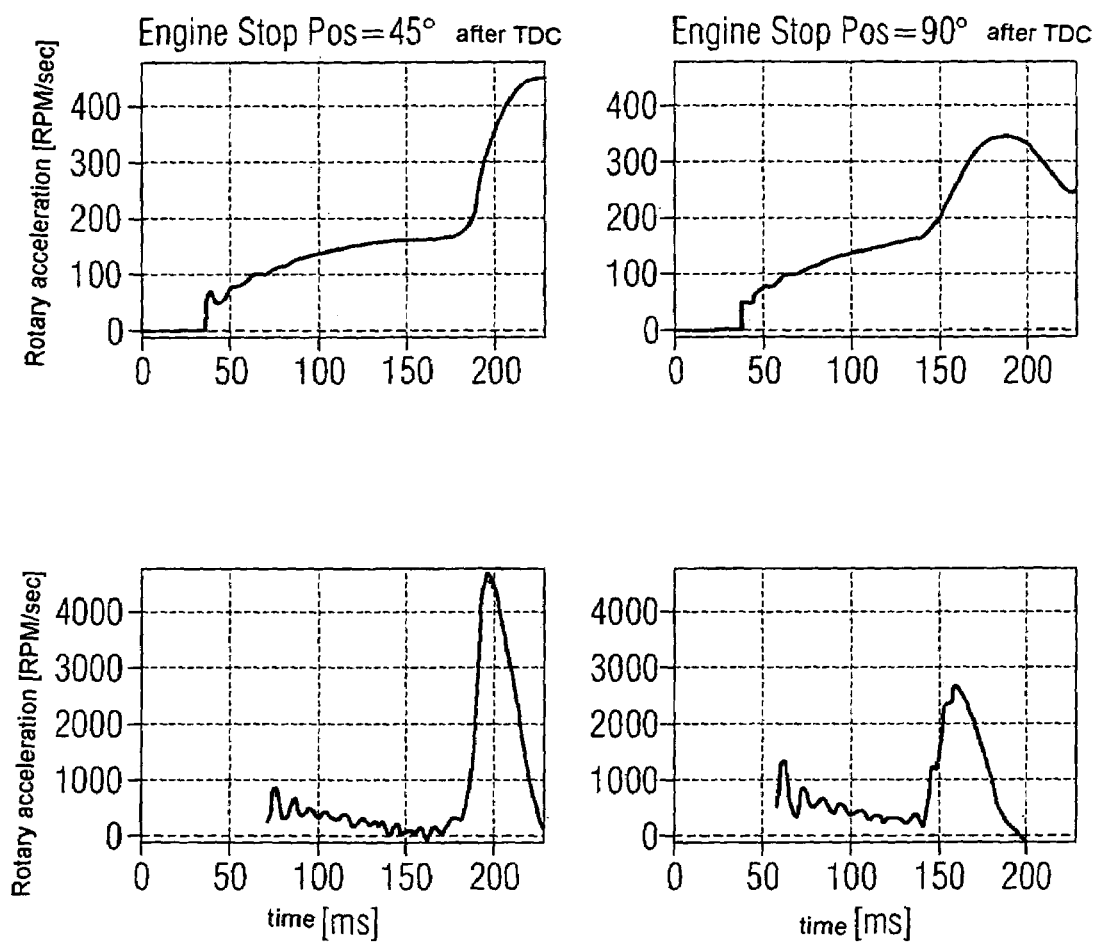

When a motor vehicle is switched off the internal combustion engine, according to the random principle, stops in different stop positions $\alpha_{stopp}$. Depending on the throttle valve opening, a mean park position of approximately 90° crankshaft angle after the top dead centre results. The stop positions occurring are almost in Gaussian distribution around this angle which is assumed as the mean position. However, it is also conceivable that internal combustion engines show a different mean stop position $\alpha_{stopp}$ because of their construction, the number of cylinders they have or because of other configuration data.

In order to create the reproducibility of the start behavior as a function of the stop position, i.e. in order to keep on achieving the same speed gradient for the various stop positions of an internal combustion engine in the case of renewed starting, a method is applied with which the efficiency of the initial combustion of the start optimization—i.e. combustions prior to synchronization—is specifically reduced. This method can also be applied to several initial combustions of the start optimization, as can occur in a multi-cylinder internal combustion engine. Thus an almost constant speed gradient is generated from any stop position whatsoever, because said stop position has the same or a greater cylinder charge than a reference stop position described in detail below (reference position).

The efficiency of the combustion during the start optimization is adjusted on the one hand by adjusting the ignition angle or on the other hand by means of the volume of air available in the cylinder. It is also preferred to use both adjustment methods in combination to control the start-stop operation of an internal combustion engine.

As basis for this method first the stop position $\alpha_{stopp}$ of the internal combustion engine is determined with the help, for example, of a crankshaft sensor. This crankshaft sensor detects the crankshaft angle even after the internal combustion engine has been switched off. The stop position $\alpha_{stopp}$ sets the maximum speed gradient $\omega_{max}$ of the initial combustion/combustions for which combustion(s) there is still no full cylinder charge, which gradient it is possible for the internal combustion engine to achieve, if the internal combustion engine is restarted during the start optimization. The maximum speed gradient $\omega_{max}$ results starting from the stop position $\alpha_{stopp}$, from the possible optimum cylinder charge with air and fuel at this stop position $\alpha_{stopp}$ and on the assumption that this cylinder charge is ignited at the optimum ignition angle. Other parameters can also be taken into consideration in order to determine the maximum speed gradient $\omega_{max}$, such as, for example, the engine temperature TCO or a variable representing the engine temperature, for example, the temperature of the engine coolant. According to one embodiment the maximum speed gradient is determined as a function of the stop position and the engine temperature $\omega_{max}=\omega_{max}(\alpha_{stopp}, TCO)$ assuming an optimal injected fuel quantity, an optimal ignition angle and an optimal inlet valve closure.

In order to limit the complexity of calculating the maximum speed gradient $\omega_{max}$ by the operating control unit of the internal combustion engine, preferably the possible maximum speed gradient $\omega_{max}$ is not constantly recalculated according to the stop position $\alpha_{stopp}$, but is read out from a stored engine characteristic map. Such an engine characteristic map can, for example, be calculated empirically for every type of internal combustion engine and then stored in the operating control unit. After the stop position $\alpha_{stopp}$ and the temperature TCO of the internal combustion engine have been determined, the corresponding maximum speed gradient $\omega_{max}$ is read out from the engine characteristic map, while the above assumptions also apply.

In order to bring the maximum speed gradients $\omega_{max}$ achievable on the basis of the different stop positions $\alpha_{stopp}$ to a common speed gradient level, the reference stop position $\alpha_{stopp-soll}$ is set. This reference stop position $\alpha_{stopp-soll}$ is characterized in that the generally standard stop positions $\alpha_{stopp}$ of the internal combustion engine lie at or before this position. Although a small proportion of the stop positions can also lie behind the reference stop position, the reference stop position is selected in such a way as to achieve an effective start optimization with short starting times. Based on this selection, it is ensured that the achievable maximum speed gradient based on the reference stop position $\alpha_{stopp-soll}$ from every stop or end position of the internal combustion engine is not exceeded. This occurs with optimal cylinder charge and optimal ignition angle when the stop position $\alpha_{stopp}$ corresponds with the reference stop position $\alpha_{stopp-soll}$. When a stop position $\alpha_{stopp}$ is smaller than the reference stop position $\alpha_{stopp-soll}$ the result is a greater cylinder charge compared to the reference stop position (reference position), so that, with reduced efficiency of the initial combustion/combustions, the maximum speed gradient of the reference stop position $\alpha_{stopp-soll}$ is adjusted. This maximum speed gradient achievable from the reference stop position $\alpha_{stopp-soll}$ under optimal conditions is designated as set speed gradient. It is also preferable to define the set speed gradient as a function of further operating parameters of the internal combustion engine, such as, for example, reference engine temperature $TCO_{soll}$.

If the stop position $\alpha_{stopp}$ is before the reference stop position $\alpha_{stopp-soll}$, as is the case if the reference stop position $\alpha_{stopp-soll}$ is chosen at, for example, 90° after the top dead centre, then by reducing the ignition angle efficiency $\eta_{IGA}$ it is possible to reduce the speed gradient of the initial combustion during the start optimization to the maximum speed gradient according to the reference stop position $\alpha_{stopp-soll}$. Further, a deviation of further operating parameters of the internal combustion engine from their reference value can be compensated for with the help of the reduction in the ignition angle efficiency. An example for this is the engine temperature TCO, whose deviation from the reference engine temperature $TCO_{soll}$ is compensated for. The ignition angle efficiency $\eta_{IGA}$ is calculated as a function of the stop position $\alpha_{stopp}$ and the engine temperature TCO according to the following quotient:

$$\eta_{IGA}(\alpha_{Stopp}, TCO) = \frac{\omega_{max}(\alpha_{Stopp-Soll}, TCO_{Soll})}{\omega_{max}(\alpha_{Stopp}, TCO)}.$$

with $\alpha_{stopp} \leq \alpha_{stopp-soll}$,
$\eta_{IGA}$ ignition angle efficiency,
$\alpha_{Stopp}$ stop position,
TCO engine temperature,
$TCO_{SOLL}$ engine reference temperature
$\omega_{max}$ maximum speed gradient,
$\alpha_{stopp-soll}$ reference stop position.

According to a further embodiment of this method the speed gradient can not only be adjusted via the ignition angle efficiency and the subsequent ignition angle adjustment, but also by adjusting the volume of air that is in the cylinder. This adjustment capability can be applied on its own or in combination with the ignition retard of the ignition angle. The volume of air that is compressed in the cylinder in the first compression stroke can be reduced by adjusting the inlet camshaft to retard. If the internal combustion engine stops in a stop position $\alpha_{stopp}$ at the bottom dead centre, there would result a maximum cylinder charge with air and fuel and hence also a possible maximum speed gradient. If the inlet camshaft is now set to maximum retard so that the inlet valve closes at, for example, 70° after the bottom dead centre, then until the inlet valve (EVS) closes, part of the air is pushed back into the inlet manifold during the compression stroke. In this way, for a stop position $\alpha_{stopp}$, a cylinder charge independent of said stop position $\alpha_{stopp}$ can be adjusted before the inlet valve EVS closes, which cylinder charge is, however, adjusted by the closing of the inlet valve. In this case, the achievable speed gradient corresponds to a stop position $\alpha_{stopp}$, which is the same as the close position EVS of the inlet valve (cf. the formula below). The above described manipulation of the cylinder charge by adjusting the inlet camshaft presupposes a control system that can also be operated when the internal combustion engine is at a standstill. This is possible, for example, with electric camshaft actuators or with an electric valve control in internal combustion engines without a camshaft.

If, as described above, the cylinder charge is reduced by retarded closing of the inlet valve, then the stop position $\alpha_{stopp}$ is defined by the close position EVS of the inlet valve, as only the close position sets the cylinder charge and the possible maximum speed gradient $\omega_{max}$ under optimal conditions. Applied to these boundary conditions of the internal combustion engine, the ignition angle efficiency $\eta_{IGA}$, already mentioned above, can, in this case, also be calculated with the help of the following equation.

$$\eta_{IGA}(\alpha_{Stopp}, TCO) = \frac{\omega_{max}(\alpha_{Stopp-Soll}, TCO_{Soll})}{\omega_{max}(\alpha_{Stopp} = EVS, TCO)}.$$

for $\alpha_{stopp} \leq \alpha_{stopp-soll}$,
and $EVS \leq \alpha_{stopp-soll}$,
$\eta_{IGA}$ ignition angle efficiency,
$\alpha_{Stopp}$ stop position,
TCO engine temperature,
$TCO_{SOLL}$ engine reference temperature
$\omega_{max}$ maximum speed gradient,
$\alpha_{stopp-soll}$ reference stop position,
EVS close position of the inlet valve.

Finally an ignition angle offset $\Delta_{IGA}$ is calculated for the initial combustion from the ignition angle efficiency defined in the above equations. This ignition angle offset is a function of the ignition angle efficiency $\eta_{IGA}$, of the stop position $\alpha_{stopp}$ and of the engine temperature TCO, so that the interrelationship $\Delta_{IGA}=\Delta_{IGA}(\eta_{IGA}, \alpha_{Stopp}, TCO)$ results. This ignition angle offset moves the ignition angle in the direction retard at a maximum speed gradient of the stop position $\alpha_{stopp}$, which gradient would be expected to be above the set speed gradient. In this way, the efficiency of the initial combustion is reduced and thus the actually achieved speed gradient is reduced to the level of the set speed gradient.

The invention claimed is:

1. A method for providing a smooth start-up in a start-stop operation of an internal combustion engine, comprising:
   detecting a crankshaft angular stop position ($\alpha_{Stopp}$) of the internal combustion engine;
   determining a speed gradient corresponding with an initial combustion of a start optimization operation of the internal combustion engine subject to the stop position ($\alpha_{stopp}$) with a volume of fuel and a volume of air present in a cylinder of the internal combustion engine at an predetermined ignition angle; and
   reducing the speed gradient to a predetermined speed gradient for different stop positions ($\alpha_{stopp}$) by retarding an ignition angle or by retarding an inlet valve timing to reduce the cylinder charge for the initial combustion.

2. The method according to claim 1, wherein the speed gradient corresponding with an initial combustion of a start optimization is a maximum speed gradient ($\omega_{max}$).

3. The method according to claim 2, further comprising:
   determining an engine characteristic map for the maximum speed gradient ($\omega_{max}$) that displays the maximum speed gradient ($\omega_{max}$) as a function of an optimal ignition angle, an optimal volume of fuel subject to the stop position ($\alpha_{Stopp}$), and an engine temperature (TCO) of the internal combustion engine.

4. The method according to claim 3, wherein the set speed gradient is defined by the maximum speed gradient $\omega_{max}$ at a set reference stop position ($\alpha_{Stopp\text{-}Soll}$) of the internal combustion engine.

5. The method according to claim 4, further comprising:
   determining the ignition retard angle for stop positions ($\alpha_{Stopp} \leq \alpha_{Stopp\text{-}Soll}$) from an ignition angle efficiency ($\eta_{IGA}$), where the ignition angle efficiency is a function of the predetermined speed gradient, the reference stop position ($\alpha_{stopp\text{-}soll}$), a reference engine temperature ($TCO_{Soll}$), the maximum speed gradient ($\omega_{max}$), the stop position ($\alpha_{Stopp}$) and the engine temperature (TCO) according to the formula:

$$\eta_{IGA}(\alpha_{Stopp}, TCO) = \frac{\omega_{max}(\alpha_{Stopp\text{-}Soll}, TCO_{Soll})}{\omega_{max}(\alpha_{Stopp}, TCO)}.$$

6. The method according to claim 4 further comprising:
   reducing a cylinder charge for the initial combustion via retarding the inlet valve timing in order to reduce the maximum speed gradient.

7. The method according to claim 6, wherein for the inlet valve timing retard, the stop position ($\alpha_{Stopp}$) is determined by a close position of the inlet valve (EVS) where the stop position equals the close position ($\alpha_{Stopp}$=EVS).

8. The method according to claim 7, further comprising:
   determining the ignition angle retard using the inlet valve timing retard for the stop position $\alpha_{Stopp} \leq \alpha_{Stopp\text{-}Soll}$ and the close position $EVS \leq \alpha_{Stopp\text{-}Soll}$ from an ignition angle efficiency ($\eta_{IGA}$) which is a function of the predetermined speed gradient and the maximum speed gradient ($\omega_{max}$) according to the formula:

$$\eta_{IGA}(\alpha_{Stopp}, TCO) = \frac{\omega_{max}(\alpha_{Stopp\text{-}Soll}, TCO_{Soll})}{\omega_{max}(\alpha_{Stopp} = EVS, TCO)}.$$

9. The method according to claim 5, further comprising:
   determining the ignition angle retard for the initial combustion via an ignition angle offset ($\Delta_{IGA}$) using the function $\alpha_{IGA} = \Delta_{IGA}(\eta_{IGA}, \alpha_{Stopp}, TCO)$ and retarding the optimal ignition angle of the initial combustion by the ignition angle offset.

10. The method according to claim 8, further comprising:
    determining the ignition angle retard for the initial combustion via an ignition angle offset ($\Delta_{IGA}$) using the function $\Delta_{IGA} = \Delta_{IGA}(\eta_{IGA}, \alpha_{Stopp}, TCO)$ and retarding the optimal ignition angle of the initial combustion by the ignition angle offset.

11. A smooth start-up start-stop operation internal combustion control device, comprising:
    a crankshaft angular stop position sensor that detects a crankshaft angular stop position of the internal combustion engine;
    a fuel volume sensor and an air volume sensor that determine a fuel volume and an air volume present in a cylinder of the internal combustion engine;
    an ignition angle sensor that determines an ignition angle of the internal combustion engine;
    an inlet valve adjusting device; and
    a control unit that:
       determines a speed gradient corresponding with an initial combustion of a start optimization operation of the internal combustion engine that is subject to a stop position with the volume of fuel and air present in a cylinder of the internal combustion engine at an optimal ignition angle, and
       reduces the speed gradient to a predetermined speed gradient for different stop positions by retarding an ignition angle or by retarding an inlet valve timing to specifically reduce the cylinder charge for the initial combustion to provide smooth start-up during start-stop operation of the internal combustion engine.

12. The device according to claim 11, wherein the control device further comprises:
    determining the ignition retard angle for stop positions from an ignition angle efficiency ($\eta_{IGA}$), where the ignition angle efficiency is a function of the predetermined speed gradient, the reference stop position ($\alpha_{stopp\text{-}soll}$), a reference engine temperature ($TCO_{Soll}$), the maximum speed gradient ($\omega_{max}$), the stop position ($\alpha_{Stopp}$) and the engine temperature (TCO) according to the formula:

$$\eta_{IGA}(\alpha_{Stopp}, TCO) = \frac{\omega_{max}(\alpha_{Stopp\text{-}Soll}, TCO_{Soll})}{\omega_{max}(\alpha_{Stopp}, TCO)}.$$

13. The device according to claim 11, wherein the control device further comprises:
    determining the ignition angle retard using the inlet valve timing retard for the stop position $\alpha_{Stopp} \leq \alpha_{Stopp\text{-}Soll}$ and the close position $EVS \leq \alpha_{Stopp\text{-}Soll}$ from an ignition angle efficiency ($\eta_{IGA}$) which is a function of the predetermined speed gradient and the maximum speed gradient ($\omega_{max}$) according to the formula:

$$\eta_{IGA}(\alpha_{Stopp}, TCO) = \frac{\omega_{max}(\alpha_{Stopp\text{-}Soll}, TCO_{Soll})}{\omega_{max}(\alpha_{Stopp} = EVS, TCO)}.$$

* * * * *